Figure 1:
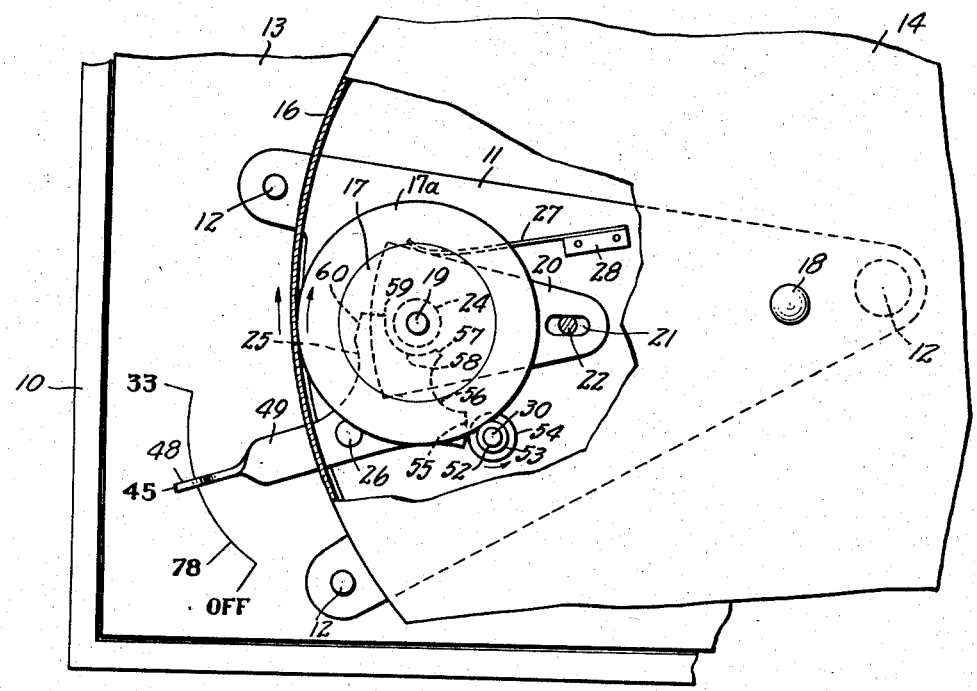

March 3, 1959   O. BABLER   2,875,623
MULTI-SPEED PHONOGRAPH DRIVE
Filed Oct. 21, 1953   2 Sheets-Sheet 1

INVENTOR
OTTO BABLER
BY Paul Kolisch
ATTORNEY

March 3, 1959 — O. BABLER — 2,875,623
MULTI-SPEED PHONOGRAPH DRIVE
Filed Oct. 21, 1953 — 2 Sheets-Sheet 2

INVENTOR
OTTO BABLER
BY Paul Kolisch
ATTORNEY

United States Patent Office 2,875,623
Patented Mar. 3, 1959

2,875,623

MULTI-SPEED PHONOGRAPH DRIVE

Otto Babler, Chicago, Ill., assignor to Webcor, Inc., a corporation of Illinois

Application October 21, 1953, Serial No. 387,371

10 Claims. (Cl. 74—190)

This invention relates to new and useful improvements in multi-speed drives for sound recording and reproducing machines and its object is the elimination of much complex mechanism customarily employed for such purpose.

In accordance with the present invention, shifting from one speed to another is effected by axially displacing the motor shaft, preferably with the rotor of the electric motor leaving the heavier part of the motor, the stator, stationary.

According to a feature of the invention, only a single idler need be employed for transmitting motion to the sound record and the plane of rotation of the idler need not be altered. Where, as in the preferred embodiment of the present invention, the idler is interposed between the stepped end of the motor shaft and a turntable, the idler is radially moved away from the shaft long enough during the axial movement of the latter to insure clearance of the driving steps.

According to another feature of the invention, the motor shaft is lifted by a cam on which the shaft end rests and which is displaced under the control of a lever controlling also the radial movement of the idler towards and away from the shaft.

These and other features of the invention will more clearly appear from the claims and the detailed description of a preferred embodiment.

Figure 2:
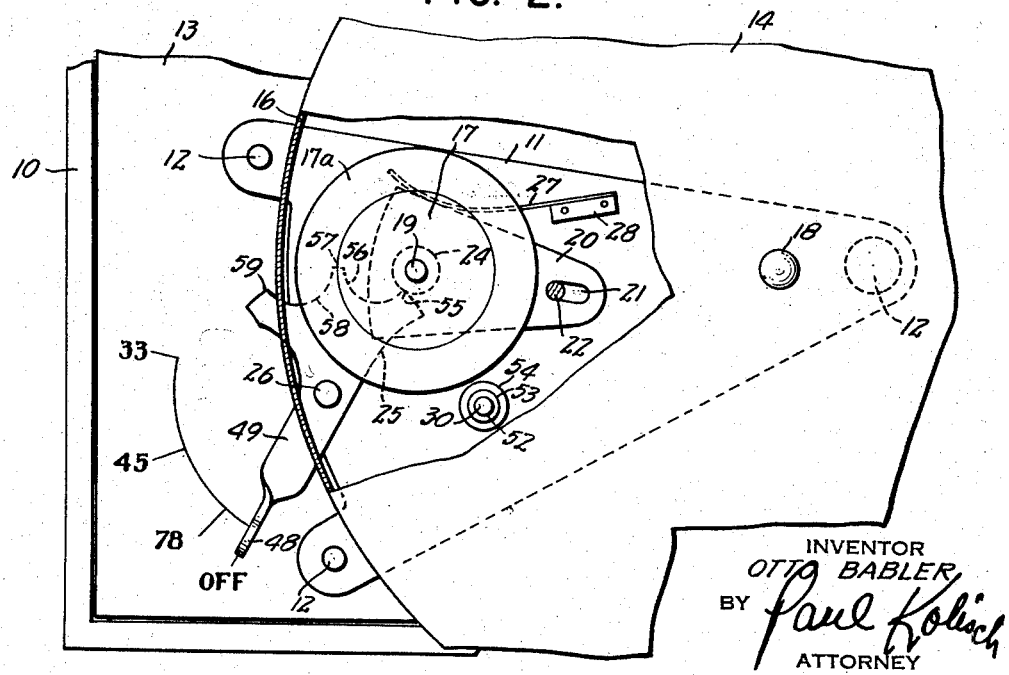
Figure 3:
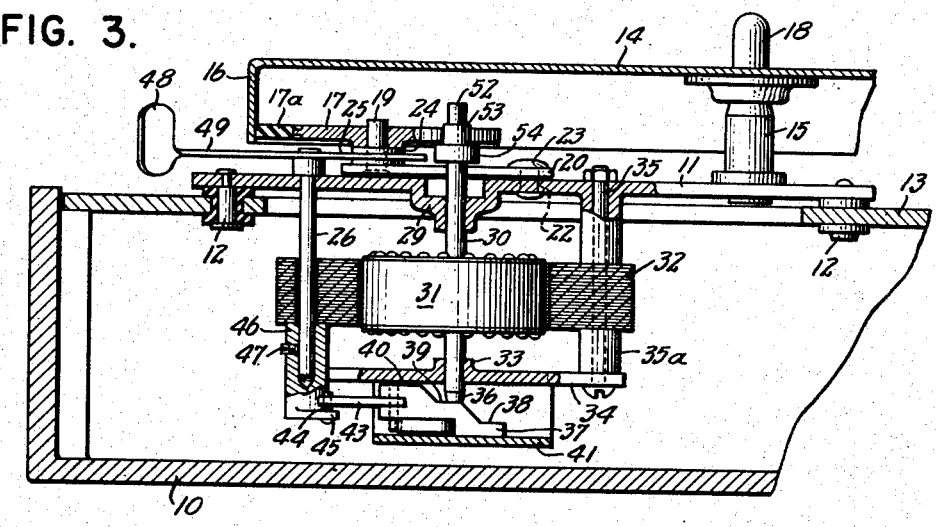
Figure 4:
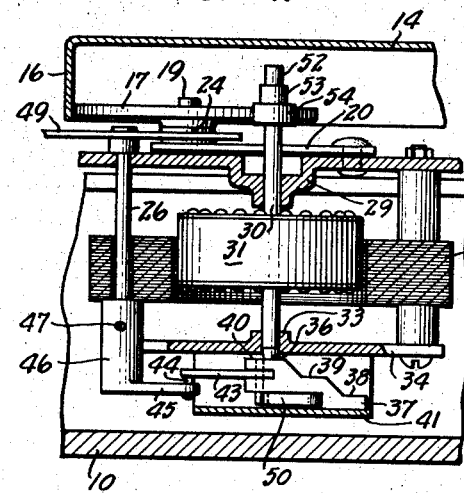
Figure 5:
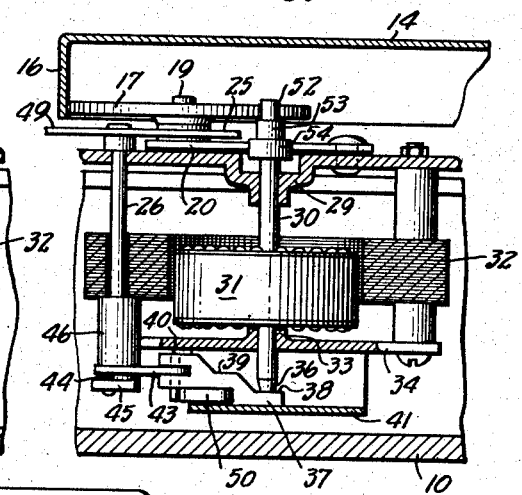
Figure 6:
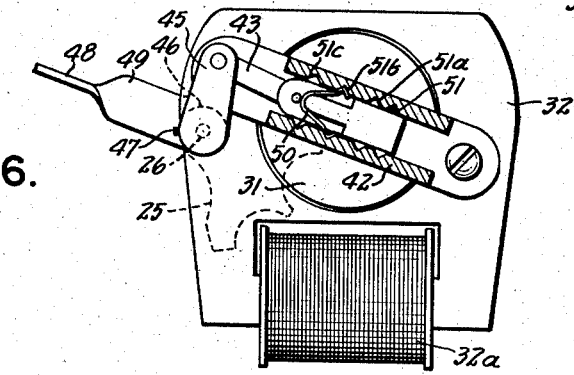

In the drawings:

Fig. 1 is a top plan view with part of the turntable broken away illustrating the phonograph drive adjusted for operation at 45 R. P. M.;

Fig. 2 shows a portion of Fig. 1 when the drive is stopped;

Figs. 3, 4 and 5 are vertical cross-sections illustrating adjustments for rotation at 45, 78 and 33 R. P. M., respectively; and Fig. 6 is a bottom view of the motor shaft lifting cam mechanism.

10 is the cabinet of the phonograph within which a wedge shaped mounting board 11 is supported in rubber cushioned studs 12 on a frame 13 seated in the open end of casing 10. A turntable 14 is rotatably supported on a stub shaft 15 projecting from the board 11. The turntable has a central record supporting pin 18 and a flange 16, the latter driven by an idler wheel 17 having a rubber tire 17a engaging the inside edge of the flange 16. The idler is rotatably mounted on a pin 19 projecting from a wedge shaped slide 20 provided on the mounting board 11. At its narrow end the slide has a slot 21 through which projects a pin 22 riveted to the mounting board 11 and headed over the slide 20 as indicated at 23. A collar 24 on the pin 19 spaces the idler 17 from the slide 20. Collar 24 cooperates with the camming surfaces of a cam 25 which is pinned to the upper end of shaft 26 projecting through the mounting board 11. A leaf spring 27 presses against the side of the slide 20 and pushes the latter with collar 24 against the cam 25, and the idler 17 radially into contact with the turntable flange and the motor shaft. The spring is fastened to the mounting board at 28.

The mounting board has a cup shaped bearing 29 through which projects motor shaft 30. Below the mounting board the rotor assembly 31 of an electric motor is fastened to shaft 30. The rotor 31 is within stator laminations 32 which are energized by stator coil 32a. The lower end of shaft 30 is seated in a bearing 33 formed in a plate 34 fastened to the lower end of bolt 35 traversing the mounting plate 11, and a sleeve 35a depending therefrom. The motor shaft is free to rotate in the bearings 33 and 29, and it may be axially displaced therein. For this purpose the lower end of the shaft 36 rests on one of the steps 38, 39, 40 of a lifting cam 37. Fig. 3 shows the shaft resting on cam surface 39, Fig. 4 on 40, and Fig. 5 on 38. The cam may be slid into any of these positions on a mounting plate 41 suspended from the plate 34 below the electric motor. The cam is held in a clamp 42 and may be moved back-and-forth by means of a linkage lever 43 pivotally mounted on a pin 44 projecting from an arm 45 fastened to the sleeve 46. The sleeve 46 may be rotated by means of the shaft 26 whose upper end carries cam 25 above the mounting board 11, and which projects through the mounting board and the stator laminations 32 into sleeve 46 and is pinned thereto at 47. Shaft 26 together with sleeve 46 and the linkage arrangement for the displacement of the cam 37 may be rocked by a lever 48 projecting from an arm 49 formed on the cam 25. As the arm 49 is rocked about the pivot point formed by shaft 26, it moves the cam 37 to the right or left. The latter is positioned by a spring 50 fastened to cam 37 and engaging indentations 51 within the clamp. As will be seen from Fig. 6 there are four pairs of indentations; 51 for the off position, 51a for the 33 R. P. M. position, the other positions of the device to be further elucidated below.

The upper end of the motor shaft 30 projects above the mounting board 11 within the space formed by the flange 16 of the turntable 14 into cooperative relation with the idler 17. The upper end of the motor shaft has three stepped portions, each of a different diameter; the smallest diameter upper end 52 adapted to drive the idler at 33 R. P. M., the medium diameter portion 53 adapted to drive the idler at 45 R. P. M., and the largest diameter portion 54 adapted to drive the idler at 78 R. P. M. In Figs. 3, 4 and 5, the shaft 30 is shown in its three positions axially displaced for driving the turntable and, therefore, the sound record at one of three speeds.

When the arm 49 is in the off position illustrated in Fig. 2, the point 55 of cam 25 engages collar 24 to move idler 17 with slide 20 against the tension of spring 27 away from the largest diameter portion 54 of the motor shaft 30. Therefore, turntable 14 is stopped. In this position of arm 49 the motor shaft 30 is in its highest position (Fig. 4) because the shaft end 36 rests on step 40 of cam 37 which via linkage 43 has been slid to its furthest right-hand position, to the right of the one shown in Fig. 4, in which 36 is seated near the left-hand shoulder of step 40. The spring 50 is in notches 51 of clamp 42.

When the arm 49 is moved into the 78 R. P. M. position the slide 20 with idler 17 is allowed to rotate counter-clockwise until collar 24 drops into the hollow 56 of cam 25. In this position the lifting cam 37 will be in the position of Fig. 4 with spring 50 engaging the notches 51a. The motor shaft end 36 will be near the right-hand shoulder of step 40, and the collar 54 of shaft 30 will be engaged by the idler 17. It will be noted from Fig. 4 that in this position the rotor 31 is lifted slightly above the top of the stator laminations 32. This, however, does not materially reduce the efficiency of the electric motor.

When it is desired to drive the turntable 14 at 45 R. P. M., the arm 49 is moved into the 45 position (Fig. 1). During the movement from 78 towards 45, the sleeve 24 rides over the cam point 57. The idler 17 will be moved away from the motor shaft so as to permit the latter freely to move axially as cam 37 is moved to the left. During the continued movement of the cam 25, the collar 24 will be riding down from the point 57 until as shown in Fig. 1, it comes to rest in the hollow 58 of the cam in which the tire 17a of the idler makes contact with the motor shaft portion 53 to drive the latter at 45 R. P. M. Through the bell crank linkage the cam 37 will be moved to the left with shaft end 36 riding down the slope from step 40 onto step 39 until the spring 50 snaps into notches 51b.

When it is desired to drive the turntable at 33 R. P. M. (Fig. 5), the cam arm 49 is moved into the position 33 (Fig. 1). While moving from 45 towards 33, cam 25 will cause the collar 24 to ride up on to point 59. This will move the idler 17 away from the motor shaft and allowing free axial movement of the latter. When the idler comes to rest on the portion 60 of the cam, the idler 17 will be firmly pressed into engagement with the end 52 of the motor shaft in which the turntable 14 will be driven at 33 R. P. M. In this position the rotor 31 is slightly below the level of the stator laminations 32. In response to the movement of cam lever 49, the shaft 26 will be rotated to move via 46, 45, 44 and 43, the cam 37 to the left, allowing the shaft end 36 to glide down the incline from step 39 to step 38.

It will be clear from the foregoing, that the drive can be moved back into any desired position. The fact that the idler 17 is moved radially away from the shaft 30 insures clearance of its driving steps 53, 54, and the sloping connection between lifting steps 38, 39, 40 insures smooth axial travel of the motor shaft.

It will be clear to those skilled in the art that while the invention has been described in connection with a specific type of sound reproducing device, many of its features are applicable to sound recording and reproducing devices of widely differing types.

I claim:

1. In a recording and reproducing device for sound records, the combination comprising an electric motor having a fixedly mounted stator and an axially movable rotor, a shaft fixed to and projecting from said rotor, means controlled by said shaft for moving the sound record at one of a plurality of speeds, and means for axially displacing said rotor and shaft relative to said fixedly mounted stator to effect change in speed of said sound record, said last-named means including a stepped camming slidably supporting the lower end of said shaft.

2. In a recording and reproducing device for sound records, the combination comprising an electric motor having a fixedly mounted stator and an axially movable rotor, a shaft fixed to and projecting from said rotor, means including an idler cooperating with said shaft for moving the sound record at one of a plurality of speeds, a lever for axially displacing said rotor and shaft relative to said fixedly mounted stator, cam means controlled by said lever for radially displacing said idler with respect to said shaft and cam means operable by said lever and slidably supporting the lower end of said shaft, said cam having a stepped construction.

3. In a sound recording and reproducing device having a turntable, an electric motor having a fixedly mounted stator and an axially movable rotor, a shaft fixed to and projecting from said rotor, means controlled by said shaft for driving the turntable at one of a plurality of speeds, said means including a collar on said shaft adjacent its end, the combination of means for axially displacing said rotor and shaft with respect to said fixedly mounted stator including a stepped cam slidably supporting said shaft.

4. In a sound recording and reproducing device having a turntable, an electric motor having a fixedly mounted stator and an axially movable rotor, a shaft fixed to and projecting from said rotor, an idler cooperating with said shaft for driving the turntable at one of a plurality of speeds, the combination of cam means for axially displacing said shaft with respect to said idler, said means being adapted to slidably support said shaft and cam means for radially displacing said idler with respect to said shaft.

5. In a recording and reproducing device for sound records, a shaft fixed to an axially movable rotor, stationary electric means for driving said rotor and shaft at a constant speed, means controlled by said shaft for moving the sound record at one of a plurality of speeds, said means including a collar on said shaft adjacent its end, an idler cooperating with said collar and shaft end, cam means supporting said shaft for axially displacing said rotor and shaft relative to said stationary electric means, and means for displacing said idler radially with respect to said shaft.

6. In a recording and reproducing device for sound records, a shaft fixed to an axially movable rotor, stationary electric means for driving said rotor and shaft at a constant speed, a turntable for the sound record, means controlled by said shaft for driving said turntable at one of a plurality of speeds, said means including a collar on said shaft adjacent one of its ends, an idler cooperating with said turntable, a cam slidably supporting the other end of said shaft and shaft end, said cam axially displacing said rotor and shaft relative to said stationary electric means, means including a second cam for displacing said idler radially with respect to said shaft, and a lever for operating both said cams.

7. In a recording and reproducing device for sound records, a shaft, an electric motor having a fixedly mounted stator and an axially movable rotor to which said shaft is fixedly attached, a turntable for the sound record, means controlled by said shaft for driving the turntable at one of a plurality of speeds, said means including a collar on said shaft adjacent its end, an idler cooperating with said collar and shaft end, first cam means for axially displacing said rotor and shaft relative to the fixedly mounted stator, second cam means for displacing said idler radially with respect to said shaft, and a lever for jointly operating said first and second means.

8. In a recording and reproducing device for sound records, an electric motor having a fixedly mounted stator and an axially movable rotor, a shaft fixed to and projecting from said rotor, means controlled by said shaft for moving the sound record at one of a plurality of speeds, said means including a collar on said shaft adjacent its end and an idler cooperating with said collar and shaft end, stepped cam means slidably supporting said shaft and a lever for axially displacing said rotor and shaft relative to said fixedly mounted stator and radially displacing said idler with respect to said shaft.

9. In a recording and reproducing device for sound records, an electric motor having a fixedly mounted stator and an axially movable rotor, a shaft fixed to and projecting from said rotor, a turntable for the sound record, said turntable having a flange, means controlled by said shaft for rotating said turntable at either of three speeds, said means including a collar on said shaft adjacent its end and an idler cooperating with said collar and shaft end and the turntable flange, cam means for axially displacing said rotor and said shaft relative to said fixedly mounted stator, said cam including a series of laterally displaced steps and inclines therebetween and means for momentarily displacing said idler radially with respect to said shaft during each axial displacement of the shaft.

10. In a recording and reproducing device for sound records, an electric motor having a fixedly mounted stator and an axially movable rotor, a shaft fixed to and projecting from said rotor, a turntable for the sound record, said turntable having a flange, means controlled by said shaft for rotating said turntable at either of three speeds, said means including a collar on said shaft adjacent one end and an idler cooperating with said collar and shaft end and the turntable flange, a first cam having a plurality of steps cooperating with the other end of said shaft selectively and slidably supporting said shaft for axially displacing said rotor and shaft relative to the fixedly mounted stator, a second cam cooperating with said idler, and a lever for simultaneously operating the second with the first cam for momentarily moving said idler radially away from said shaft and then allowing the idler to return in contact with the shaft during each axial displacement of the shaft as its other end moves from one step into contact with another step of the first cam.

References Cited in the file of this patent

UNITED STATES PATENTS

| | | |
|---|---|---|
| 2,047,733 | Harrison | July 14, 1936 |
| 2,254,066 | Gruber et al. | Aug. 26, 1941 |
| 2,381,079 | Pittman | Aug. 7, 1945 |
| 2,650,504 | Tateishi | Sept. 1, 1953 |
| 2,655,812 | Morrison | Oct. 20, 1953 |

FOREIGN PATENTS

| | | |
|---|---|---|
| 714,813 | Great Britain | Sept. 1, 1954 |